United States Patent
Tian

(10) Patent No.: US 9,155,948 B2
(45) Date of Patent: Oct. 13, 2015

(54) FOLDING-TYPE LUGGAGE PANEL ON GOLF CART

(71) Applicant: SHENZHEN AOXIANG INDUSTRIAL DEVELOPMENT CO., LTD., Shenzhen (CN)

(72) Inventor: Qiang Tian, Shenzhen (CN)

(73) Assignee: SHENZHEN AOXIANG INDUSTRIAL DEVELOPMENT CO., Shenzhen (CN)

( * ) Notice: Subject to any disclaimer, the term of this patent is extended or adjusted under 35 U.S.C. 154(b) by 0 days.

(21) Appl. No.: 14/582,022

(22) Filed: Dec. 23, 2014

(65) Prior Publication Data

US 2015/0196815 A1    Jul. 16, 2015

(30) Foreign Application Priority Data

Jan. 15, 2014  (CN) .................... 2014 2 0023951 U

(51) Int. Cl.
*B60R 9/06* (2006.01)
*B60R 9/08* (2006.01)
*A63B 55/00* (2015.01)

(52) U.S. Cl.
CPC ............. *A63B 55/008* (2013.01); *B60R 9/06* (2013.01); *B60R 9/08* (2013.01); *B62B 2202/404* (2013.01)

(58) Field of Classification Search
CPC ........ B60R 9/06; B60R 9/08; B62B 2202/404
USPC .......................... 224/274, 282, 499, 507, 526
See application file for complete search history.

(56) References Cited

U.S. PATENT DOCUMENTS

| | | | | |
|---|---|---|---|---|
| 4,125,284 A * | 11/1978 | Hicks et al. | ..................... | 296/62 |
| 5,427,289 A * | 6/1995 | Ostor | ........................... | 224/499 |
| 5,676,292 A * | 10/1997 | Miller | ........................... | 224/524 |
| 6,557,882 B2 * | 5/2003 | Harrington | ............... | 280/415.1 |
| 6,948,732 B2 * | 9/2005 | Amacker | .................. | 280/415.1 |
| 8,313,133 B2 * | 11/2012 | King | ................................. | 296/69 |
| 8,474,561 B2 * | 7/2013 | Allingham | ................ | 180/89.11 |
| RE44,454 E * | 8/2013 | Aghajanian | .................. | 224/499 |
| 9,027,809 B1 * | 5/2015 | Ezra | ............................... | 224/519 |
| 2004/0031639 A1 * | 2/2004 | Deves et al. | .................. | 180/311 |
| 2005/0264048 A1 * | 12/2005 | Collins | .................... | 297/188.01 |
| 2009/0056592 A1 * | 3/2009 | Threet et al. | .................... | 108/11 |
| 2009/0277856 A1 * | 11/2009 | Lin | .............................. | 211/195 |
| 2014/0217767 A1 * | 8/2014 | Heit et al. | .................. | 296/65.16 |
| 2015/0021371 A1 * | 1/2015 | Ward et al. | .................... | 224/499 |

* cited by examiner

*Primary Examiner* — Gary Elkins
(74) *Attorney, Agent, or Firm* — Symbus Law Group LLC; Clifford D. Hyra

(57) ABSTRACT

A folding-type luggage panel provided on a main body of a golf cart has a fixed panel and a turnover panel. A fixed support is provided on the fixed panel, the fixed support and the main body of the golf cart are fixed with each other, a rotation shaft is provided on the fixed support and the outer side of the back end surface of the fixed panel, a rotation block is movably sleeved on the rotation shaft and fixed with the turnover panel so that the turnover panel may be rotated around the rotation shaft, and the back end surface of the fixed panel and the front end surface of the turnover panel are matched with each other through a positioning hole and a positioning convex block provided on a joint surface of the bodies of the two panels, so that the bodies are closely engaged with each other.

7 Claims, 2 Drawing Sheets

FOLDING-TYPE LUGGAGE PANEL ON GOLF CART

This application claims the benefit of Chinese Utility Model Application No. 201420023951.6, filed Jan. 15, 2014, which is hereby incorporated by reference herein in its entirety.

FIELD OF THE INVENTION

The invention relates to the field of golf carts, and particularly to a folding-type luggage panel on a golf cart.

BACKGROUND

In order to be able to load more luggage, a trailing frame on a golf cart in the prior art is provided with a folding-type luggage panel. However, in the folding-type luggage panel in the prior art, the bodies of two panels are not bound closely enough. When the body of one of the panels is pressed because a heavy object is placed on it, due to the deformation of the bodies of the panels under the pressure, the bodies of the two panels are uneven with each other.

SUMMARY

In order to overcome the above defects, the object of the invention is to provide a folding-type luggage panel on a golf cart.

The object of the invention is realized through the following technical solution:

In one aspect, the invention relates to a folding-type luggage panel on a golf cart provided on a main body of the golf cart and comprising a fixed panel and a turnover panel, a fixed support provided on the fixed panel, where the fixed support and the main body of the golf cart are fixed with each other, a rotation shaft provided on the fixed support and the outer side of the back end surface of the fixed panel, and a rotation block movably sleeved on the rotation shaft and fixed with the turnover panel so that the turnover panel may be rotated around the rotation shaft, where the back end surface of the fixed panel and the front end surface of the turnover panel are matched with each other through a positioning hole and a positioning convex block.

In a further aspect, the positioning hole is provided on the back end surface of the fixed panel and the positioning convex block is provided on the front end surface of the turnover panel.

In a further aspect, there is more than one positioning hole and the number of the positioning convex blocks is identical to the number of the positioning holes.

In a further aspect, raised lines are provided on the upper end surfaces of both the fixed panel and the turnover panel.

In a further aspect, a flange protruding upwards is provided on the back side edge of the upper end surface of the turnover panel.

In a further aspect, the rotation block is made of metal material.

In a further aspect, a cushion is provided on the lower end surface of the turnover panel.

As to the folding-type luggage panel of the invention, the positioning hole and the positioning block are provided on a joint surface of the bodies of the two panels, so that the bodies are closely engaged with each other.

BRIEF DESCRIPTION OF THE DRAWINGS

In order to be described easily, the invention is described with the following embodiments and figures in details.

DETAILED DESCRIPTION OF THE EMBODIMENTS

The invention will be further described in more details with combination of the following drawings and embodiments in order to make the purposes, the technical solution and the advantages of the invention more apparent. It shall be understood that the embodiments described herein are only used for explaining the invention but do not limit the invention.

Figure 1:
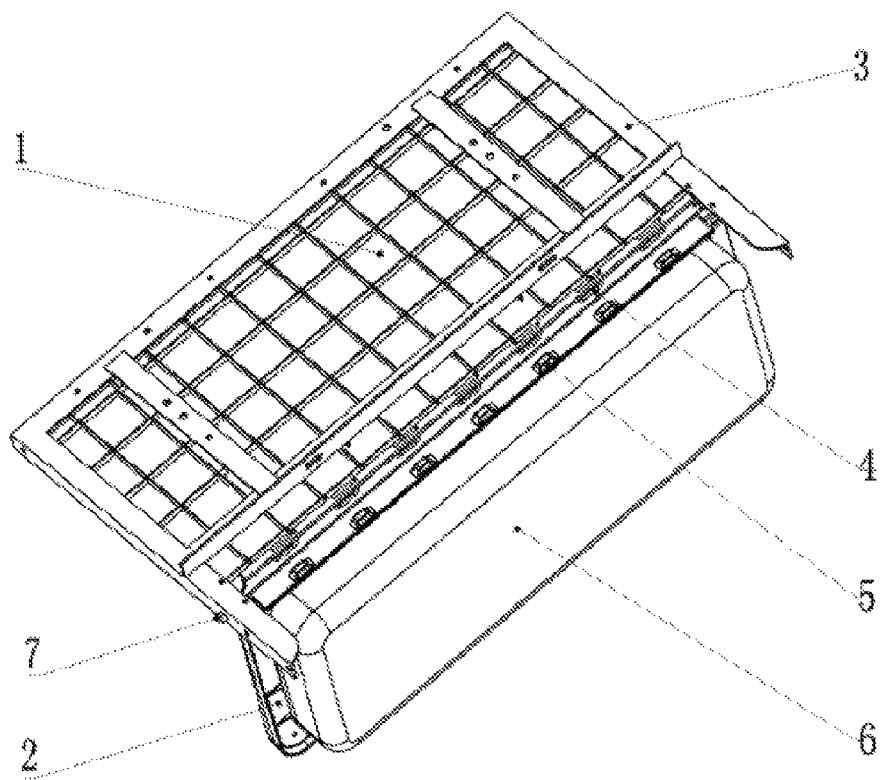
FIG. 1 is a diagram of a turnover state of the invention.
Figure 2:
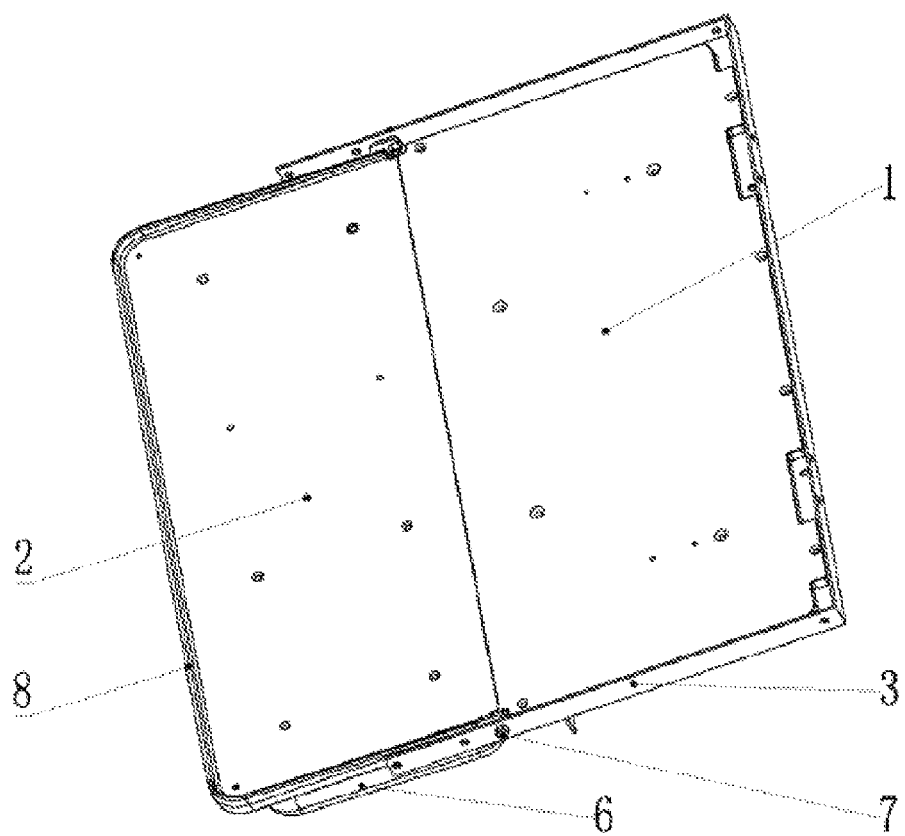
FIG. 2 is a diagram of an opening state of the invention.

As shown in FIG. 1 and FIG. 2, the invention relates to a folding-type luggage panel on a golf cart provided on a main body of the golf cart and comprising a fixed panel 1 and a turnover panel 2, a fixed support 3 provided on the fixed panel 1, the fixed support 3 and the main body of the golf cart being fixed with each other, a rotation shaft 7 provided on the fixed support 3 and the outer side of the back end surface of the fixed panel 1, and a rotation block movably sleeved on the rotation shaft 7 and fixed with the turnover panel 2 so that the turnover panel 2 may be rotated around the rotation shaft 7, where the back end surface of the fixed panel 1 and the front end surface of the turnover panel 2 are matched with each other through a positioning hole 4 and a positioning convex block 5. When the turnover panel 2 is opened, the upper surface of the fixed panel 1 is aligned with the lower surface of the turnover panel 2 and the positioning convex block 5 is accessed into the positioning hole 4, so that the fixed panel 1 and the turnover panel 2 are closely engaged with each other.

Furthermore, the positioning hole 4 is provided on the back end surface of the fixed panel 1 and the positioning convex block 5 is provided on the front end surface of the turnover panel 2.

Furthermore, the number of the positioning holes 4 is more than one and the number of the positioning convex blocks 5 is identical to the number of the positioning holes 4. A plurality of the positioning holes 4 and the positioning convex blocks 5 are provided, so that they are stressed evenly.

Furthermore, raised lines are provided on the upper end surfaces of both the fixed panel 1 and the turnover panel 2.

Furthermore, a flange 8 protruding upwards is provided on the back side edge of the upper end surface of the turnover panel 2, which operates to prevent the luggage from sliding down.

Furthermore, the rotation block is made of a metal material.

Furthermore, a cushion 6 is provided on the lower end surface of the turnover panel 2, so that when the turnover panel 2 is closed, the luggage panel becomes a seat for a passenger.

The above-mentioned are only embodiments of the invention and do not limit the invention, Any modification, equal replacement and improvement made within the spirit and the principle of the invention shall fall within the protection scope of the invention.

The invention claimed is:
1. A folding-type luggage panel on a golf cart provided on a main body of the golf cart and comprising:
 a fixed panel and a turnover panel;
 wherein:
 a fixed support is provided on the fixed panel;
 the fixed support and the main body of the golf cart are fixed with each other;
 a rotation shaft is provided on the fixed support and an outer side of a back end surface of the fixed panel;

a rotation block is movably sleeved on the rotation shaft and fixed with the turnover panel so that the turnover panel may be rotated around the rotation shaft; and the back end surface of the fixed panel and a front end surface of the turnover panel are matched with each other through one or more positioning holes and one or more positioning convex blocks.

2. A folding-type luggage panel on a golf cart according to claim 1, wherein the positioning hole is provided on the back end surface of the fixed panel and the positioning convex block is provided on the front end surface of the turnover panel.

3. A folding-type luggage panel on a golf cart according to claim 2, wherein the one or more positioning holes comprises a plurality of positioning holes, the number of the positioning convex blocks is identical to the number of the positioning holes.

4. A folding-type luggage panel on a golf cart according to claim 3, wherein raised lines are provided on upper end surfaces of both the fixed panel and the turnover panel.

5. A folding-type luggage panel on a golf cart according to claim 4, wherein a flange protruding upwards is provided on a back side edge of the upper end surface of the turnover panel.

6. A folding-type luggage panel on a golf cart according to claim 5, wherein the rotation block is made of a metal material.

7. A folding-type luggage panel on a golf cart according to claim 6, wherein a cushion is provided on a lower end surface of the turnover panel.

\* \* \* \* \*